United States Patent
Muraji et al.

(10) Patent No.: US 8,077,188 B2
(45) Date of Patent: Dec. 13, 2011

(54) GAMMA CORRECTION DEVICE AND GAMMA CORRECTION METHOD FOR LIQUID CRYSTAL DISPLAY DEVICE

(75) Inventors: Akio Muraji, Hirakata (JP); Kazunobu Oketani, Yawata (JP); Satoshi Nakajo, Osaka (JP); Hiromitsu Okuno, Osaka (JP); Hisashi Nakamura, Kobe (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 953 days.

(21) Appl. No.: 11/926,673

(22) Filed: Oct. 29, 2007

(65) Prior Publication Data

US 2008/0100549 A1    May 1, 2008

(30) Foreign Application Priority Data

Oct. 31, 2006   (JP) ................................. 2006-296918

(51) Int. Cl.
G09G 5/10   (2006.01)
(52) U.S. Cl. .......................................... 345/690; 345/87
(58) Field of Classification Search ............ 345/87–104, 345/690
See application file for complete search history.

(56) References Cited

U.S. PATENT DOCUMENTS 6,377,321 B1 *   4/2002   Khan et al. ...................... 349/35

FOREIGN PATENT DOCUMENTS

| JP | 2004-101652 A | 4/2004 |
|----|---------------|--------|
| JP | 2004-117598 A | 4/2004 |
| JP | 2004-212605 A | 7/2004 |
| JP | 2005345131 A * | 12/2005 |

OTHER PUBLICATIONS

Japanese Office Action dated Apr. 19, 2011, issued in corresponding Japanese Patent Application No. 2006-296918.
Japanese Office Action dated Aug. 2, 2011, issued in corresponding Japanese Patent Application No. 2006-296918.

* cited by examiner

*Primary Examiner* — Richard Hjerpe
*Assistant Examiner* — Dorothy Harris
(74) *Attorney, Agent, or Firm* — Westerman, Hattori, Daniels & Adrian, LLP (57) ABSTRACT

A gamma correction device for a liquid crystal display device including LCD panels. The gamma correction device includes a storage device for storing gamma correction data corresponding to chiral directions of LCD panels. A chiral direction data acquisition circuit acquires chirality data on the chiral direction of a LCD panel arranged in the liquid crystal display device. A control circuit sets a gamma correction datum adapted to the chiral directions of the LCD panel arranged in the liquid crystal display device selectively from the stored gamma correction data based on the acquired chirality data. A gamma correction circuit performs a gamma correction process on image signals provided to the LCD panel using the set gamma correction datum.

8 Claims, 10 Drawing Sheets

| Digital Gamma Correction Data Dn | Green LCD Panel | Red LCD Panel | Blue LCD Panel |
|---|---|---|---|
| D1 | Left | Right | Right |
| D2 | Left | Right | Left |
| D3 | Left | Left | Right |
| D4 | Left | Left | Left |
| D5 | Right | Left | Left |
| D6 | Right | Left | Right |
| D7 | Right | Right | Left |
| D8 | Right | Right | Right |

| Digital Gamma Correction Data Dn | Green LCD Panel | Red LCD Panel | Blue LCD Panel |
|---|---|---|---|
| D1 | Left | Right | Right |
| D5 | Right | Left | Left |

GAMMA CORRECTION DEVICE AND GAMMA CORRECTION METHOD FOR LIQUID CRYSTAL DISPLAY DEVICE

BACKGROUND OF THE INVENTION

The present invention relates to a device and a method for performing a gamma correction process on image signals for a liquid crystal display device such as a liquid crystal display projector.

A liquid crystal display device such as liquid crystal display (LCD) projector is widely used to enlarge and project an image such as computer screen image on a projector screen to perform a presentation or the like. In an LCD projector, signal processing such as digital conversion is performed on image signals provided to the LCD projector from an external device (e.g., computer). The LCD projector includes LCD panels and LCD drivers for respectively driving the LCD panels by generating an appropriate drive voltage based on processed image signals and applying the appropriate drive voltage to each display segment in the LCD panels. The LCD projector further includes a light source that emits light beam towards the LCD panels. The light is transmitted through images formed on the LCD panels to generate red, green, and blue image lights. A prism combines the three image lights to generate color image light. The LCD projector includes a projection lens for focusing the color image light on a projector screen so as to display an enlarged image on the projector screen.

A single liquid crystal display device includes a plurality of (normally three) LCD panels. Each LCD panel may have a different light transmission characteristic (hereinafter referred to as "V-T characteristic") with respect to the drive voltage. This results in a difference in contrast ratio between LCD panels. To reduce the difference in contrast ratio, the signals provided to the LCD panel undergo a known correction (gamma correction). Gamma correction is described in, for example, Japanese Laid-Open Patent Publication No. 2004-212605 (IPC: G09G 3/36). In the gamma correction described in the publication, various types of gamma correction data are provided in advance in correspondence with the relationship between the contrast values of the three LCD panels. The V-T characteristics of the three LCD panels are measured with an illuminometer in a state in which gamma correction process is not performed. The V-T characteristic values measured by the illuminometer are provided to the microcomputer and compared with the relationship of the contrast values of the three LCD panels. An optimum gamma correction datum is selected from a plurality of gamma correction data for different characteristics in accordance with the comparison result. Three correction values respectively corresponding to the three LCD panels are calculated from the selected gamma correction datum. The signal (drive signal) provided to each LCD panel is corrected with the corresponding correction value.

SUMMARY OF THE INVENTION

There are two types of LCD panels. One type is a LCD panel (hereinafter referred to as a levorotatory panel or left-handed rotation panel) in which the torsion direction of the liquid crystal molecules between liquid crystal display substrates (hereinafter referred to as chiral direction) is the counterclockwise direction when viewed from the incident direction of the image light. The other type is a LCD panel (hereinafter referred to as a dextrorotatory panel or right-handed rotation panel) having a counterclockwise chiral direction. In an LCD projector incorporating a plurality of LCD panels, the chromaticity characteristic may differ between products depending on the combination of the two types of LCD panels. However, the gamma correction of the above publication uses gamma correction data to reduce the difference in contrast ratio between the LCD panels. Thus, it is difficult to reduce differences in chromaticity characteristics between LCD projectors caused by differences in the chiral directions of the LCD panels.

Further, in the above publication, an instrument such as an illuminometer for measuring the V-T characteristics of the liquid crystal is necessary to select the gamma correction data during gamma correction. Thus, the device for performing gamma correction is complicated.

The present invention provides a gamma correction device and a gamma correction method for a liquid crystal display device enabling the setting of gamma correction data that reduces differences in chromaticity characteristics between liquid crystal display devices without using a measurement instrument such as an illumination sensor.

One aspect of the present invention is a gamma correction device for a liquid crystal display device. The gamma correction device includes a storage device which stores gamma correction data corresponding to chiral directions of liquid crystal display panels. A chiral direction data acquisition circuit acquires chirality data on a chiral direction of a liquid crystal display panel arranged in the liquid crystal display device. A control circuit is connected to the chiral direction data acquisition circuit and sets a gamma correction datum adapted to the chiral direction of the liquid crystal display panel arranged in the liquid crystal display device selectively from the stored gamma correction data based on the acquired chirality data. A gamma correction circuit performs a gamma correction process on image signals provided to the liquid crystal display panel using the set gamma correction datum.

A further aspect of the present invention is a gamma correction method for a liquid crystal display device. The method includes storing gamma correction data corresponding to chiral directions of liquid crystal display panels, acquiring chirality data on a chiral direction of a liquid crystal display panel arranged in the liquid crystal display device, setting a gamma correction datum adapted to the chiral direction of the liquid crystal display panel arranged in the liquid crystal display device selectively from the stored gamma correction data based on the acquired chirality data, and performing a gamma correction process on image signals provided to the liquid crystal display panel using the set gamma correction datum.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A liquid crystal display device according to a first embodiment of the present invention will now be described with reference to the drawings. In the illustrated embodiment, the liquid crystal display device is a liquid display device (LCD) projector 1 including three LCD panels 7, 8, and 9.

Figure 1:
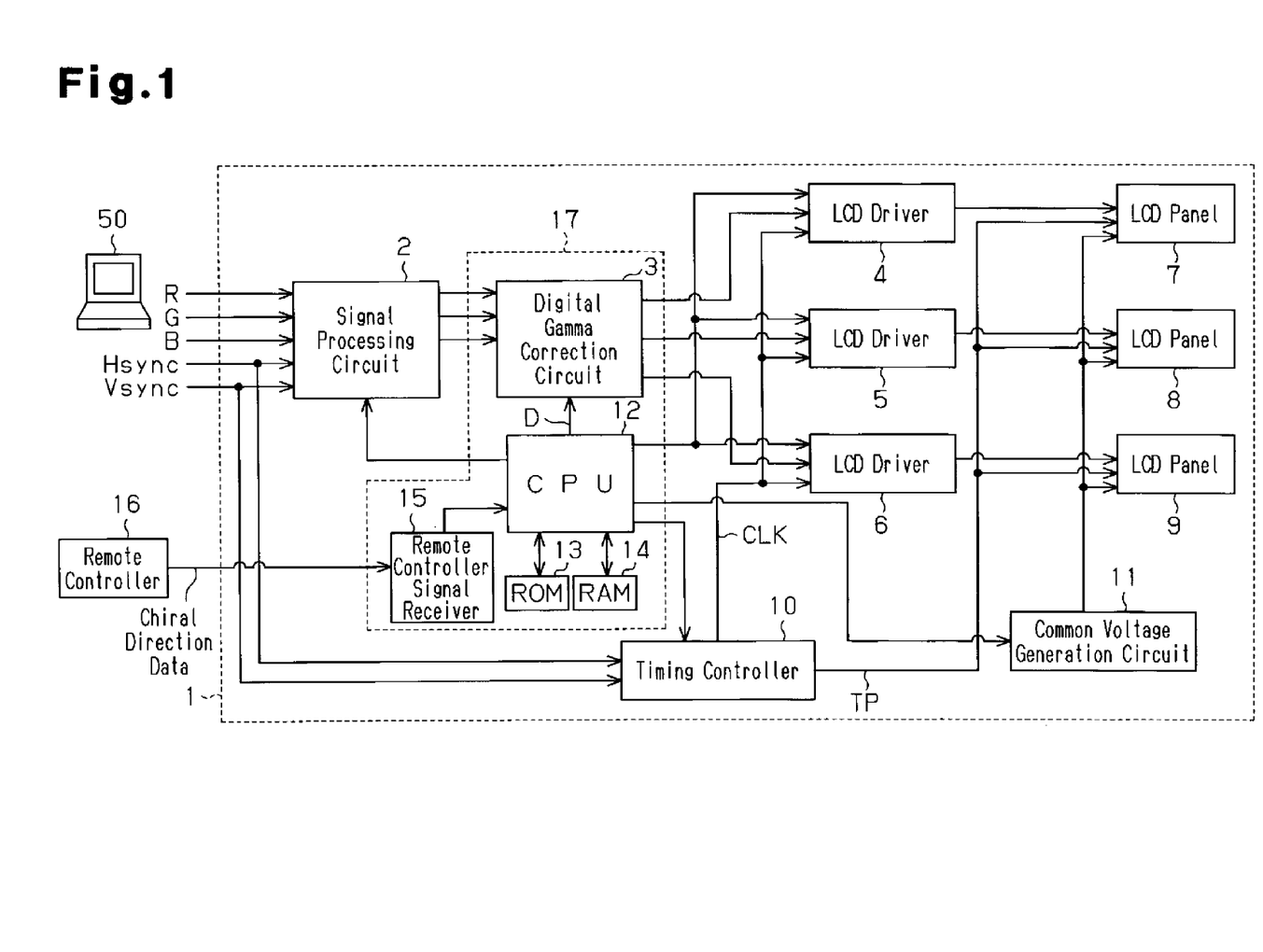
FIG. 1 is a block diagram of a liquid crystal display device incorporating a gamma correction device according to a first embodiment of the present invention.

As shown in FIG. 1, the LCD projector 1 is provided with image signals from an image signal supply source such as an external device (e.g., computer 50). A signal processing circuit 2 performs signal processing on each image signal and provides the processed image signal to a digital gamma correction circuit 3. The digital gamma correction circuit 3 performs a digital gamma correction process on each processed image signal. Then, the digital gamma correction circuit 3 provides the corrected image signal to a red LCD driver 4, a green LCD driver 5, and a blue LCD driver 6. The LCD drivers 4 to 6 respectively drive a red LCD panel 7, a green LCD panel 8, and a blue LCD panel 9. A timing controller 10 generates a timing signal based on a horizontal synchronous signal Hsync and a vertical synchronous signal Vsync that are provided to the LCD projector 1. A common voltage generation circuit 11 generates common voltage.

The LCD panels 7 to 9 are, for example, active matrix drive type thin film transistor (TFT) LCD panels. This type of LCD panel includes an effective pixel section formed by an m×n matrix of a plurality of pixels, a vertical scanning circuit for driving each scanning line, a horizontal scanning circuit for scanning each horizontal line, and a thin film transistor serving as a switching element.

The LCD projector 1 includes a CPU 12, which serve as a control circuit, and a ROM 13 and RAM 14, which serve as storage devices. The ROM 13 and the RAM 14 are connected to the CPU 12. The CPU 12 controls each circuit of the LCD projector 1 including the signal processing circuit 2 and the digital gamma correction circuit 3 according to programs stored in the ROM 13 and data stored in the RAM 14.

A remote controller signal receiver 15, which serves as a chiral direction data acquisition circuit, receives a remote controller signal (e.g., light signal) from a remote controller 16 and provides the signal (e.g., electrical signal) to the CPU 12.

As shown in FIG. 1, the LCD projector 1 incorporates a gamma correction device 17, which includes the digital gamma correction circuit 3, the CPU 12 serving as the control circuit, the remote controller signal receiver 15 serving as the chiral direction data acquisition circuit, and the ROM 13 and RAM 14 serving as the storage devices.

The operation of the LCD projector 1 will now be described.

The signal processing circuit 2 of the LCD projector 1 receives image signals R, G, and B from the external device (e.g., computer 50). The signal processing circuit 2 also receives the horizontal synchronous signal Hsync and the vertical synchronous signal Vsync and performs a predetermined signal process on the image signals R, G, and B. For example, if the image signals R, G, and B provided from the computer 50 are analog signals, the signal processing circuit 2 samples the image signals R, G, and B at an appropriate timing and converts the analog signals to digital signals. If the digital signals are interlaced scan signals, the signal processing circuit 2 converts the interlaced scan signals to progressive scan signals, and generates signal processed image signals R, G, and B. The LCD projector 1 may include an input switching circuit (not shown) for selecting the supply source of the image signals. In such a case, image signals can be selectively received from external devices other than the computer 50.

The signal processed image signals R, G, and B are, for example, digital signals. The signal processing circuit 2 sends the signal processed image signals R, G, and B to the digital gamma correction circuit 3. The digital gamma correction circuit 3 performs the gamma correction process on the signal processed image signals R, G, and B based on digital gamma correction datum D stored in advance in the ROM 13 or the RAM 14.

Figure 2:
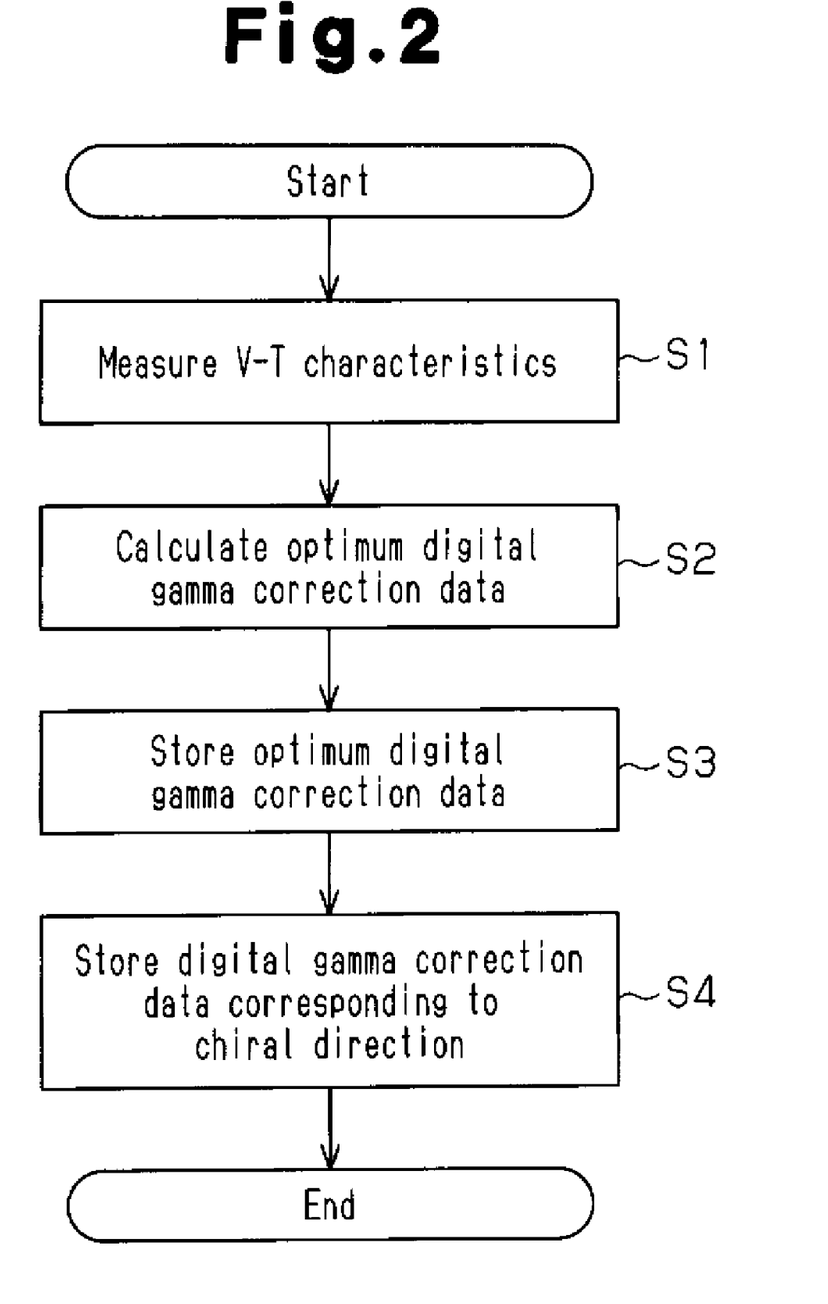
FIG. 2 is a flowchart showing the procedures for storing gamma correction datum in advance.

The digital gamma correction datum D will now be described. FIG. 2 shows a flowchart of the procedures for setting the digital gamma correction datum D in the LCD projector 1 when manufacturing the LCD projector 1. In step S1 of FIG. 2, in a state in which the digital gamma correction datum D is not set, the manufacturer measures the illuminance of each gradient of the image light projected from the LCD projector 1 and the V-T characteristics of each LCD panel 7 to 9 with an illumination sensor (not shown). In step S2, the manufacturer calculates optimum digital gamma correction datum Ddef to reduce differences in chromaticity characteristics caused by the combination of the chiral direction of the LCD panels and the difference in contrast ratio between the LCD panels based on the measured V-T characteristics of each LCD panel 7 to 9. In step S3, the manufacturer connects a digital gamma correction data write device (not shown) to the CPU 12 and stores the calculated digital gamma correction datum Ddef in the ROM 13 or the RAM 14 via the CPU 12. The digital gamma correction datum Ddef is used in the gamma correction process as initialized digital gamma correction datum.

The manufacturer stores in advance digital gamma correction data Dn (also referred to as alternative gamma correction data that are potentially selectable when replacing one or more LCD panels) corresponding to the combination of the chiral directions of the LCD panels in the ROM 13 or the RAM 14. The digital gamma correction data Dn is in correspondence with each combination of a levorotatory panel and a dextrorotatory panel.

The digital gamma correction data Dn will now be described using chromaticity characteristic charts.

Figure 3:
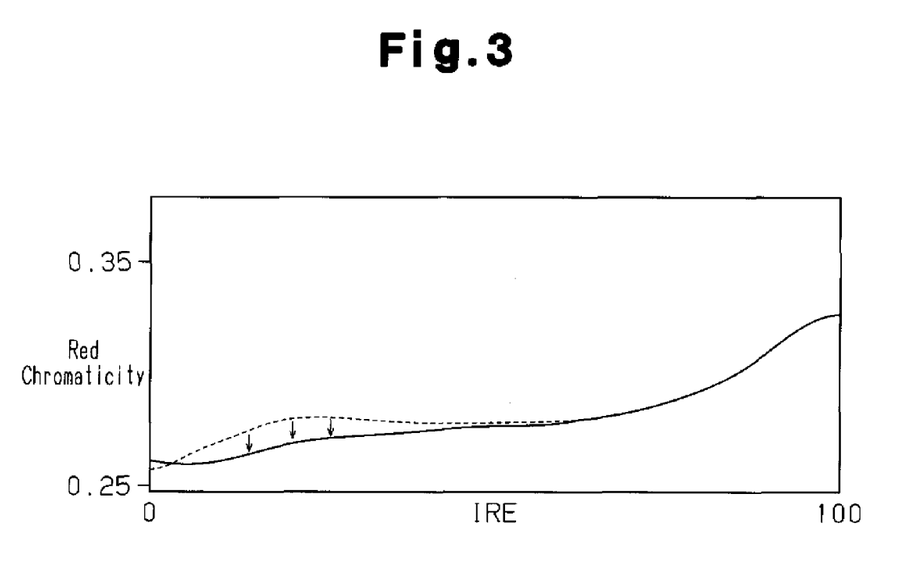
FIG. 3 is a chart showing the chromaticity for red in a color image light of a dextrorotatory projector and a levorotatory projector.
Figure 4:
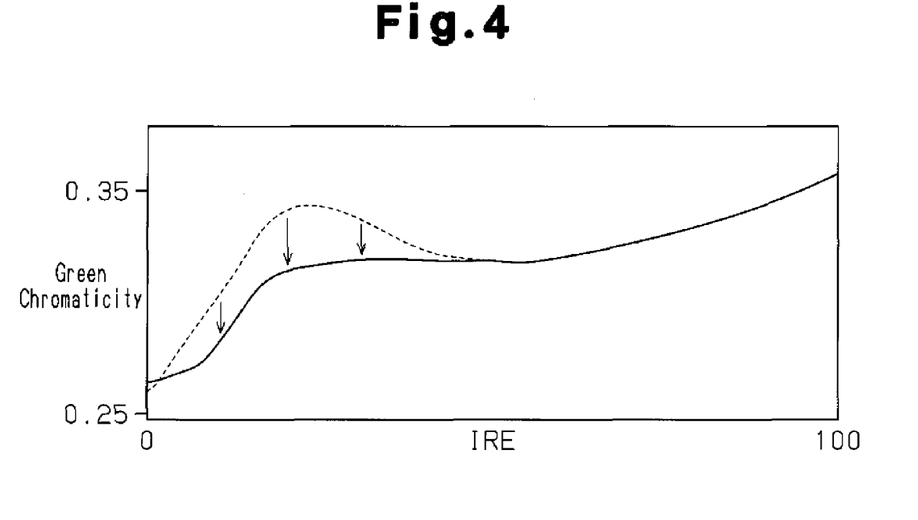
FIG. 4 is a chart showing the chromaticity for green in the color image light of the dextrorotatory projector and the levorotatory projector.
Figure 5:
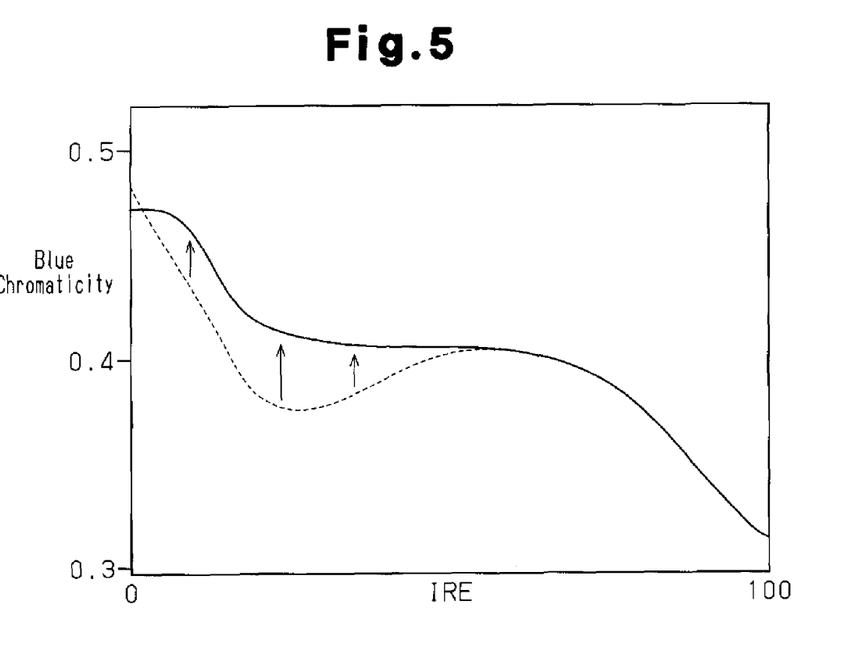
FIG. 5 is a chart showing chromaticity for blue in the color image light of the dextrorotatory projector and the levorotatory projector.

In FIGS. 3 to 5, the solid lines show the chromaticity characteristics of the LCD projector (hereinafter referred to as "levorotatory projector") in which the green LCD panel 8 is a levorotatory panel and the red LCD panel 7 and blue LCD panel 9 are dextrorotatory panels. The broken lines of FIGS. 3 to 5 show the chromaticity characteristics of the LCD projector (hereinafter referred to as "dextrorotatory projector") in which the green LCD panel 8 is a dextrorotatory panel and the red LCD panel 7 and blue LCD panel 9 are levorotatory panels. The vertical axis of FIGS. 3 to 5 represent the chromaticity of each color generated by the LCD projector when image signals R, G, and B of the same level are input to the LCD projector 1. The horizontal axis represents the level of the image signal. The image signal level changes from 0 IRE (Institute of Radio Engineers), which is the minimum luminance gradient (black), to 100 IRE, which is the maximum luminance gradient (white). The chromaticity has a relationship in which the chromaticity sum of red, green, and blue is one (red chromaticity+green chromaticity+blue chromaticity=1).

As shown in FIG. 3, the red chromaticity of the dextrorotatory projector is slightly higher than that of the levorotatory projector when the luminance is low. As shown in FIG. 4, the green chromaticity of the dextrorotatory projector is higher than that of the levorotatory projector when the luminance is low. As shown in FIG. 5, the blue chromaticity of the dextrorotatory projector is lower than that of the levorotatory projector when the luminance is low. In the first embodiment, after replacement of an LCD panel, gamma correction is performed with digital gamma correction datum (also referred to as updated digital gamma correction datum) selected from the digital gamma correction data Dn prepared in advance to reduce the chromaticity difference between the dextrorotatory projector and the levorotatory projector.

Figure 6:
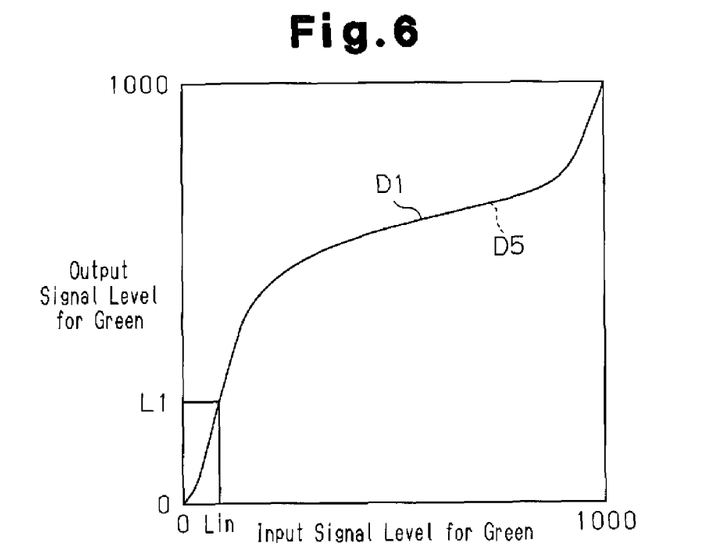
FIG. 6 is a chart showing the gamma correction data for a green image signal.
Figure 7:
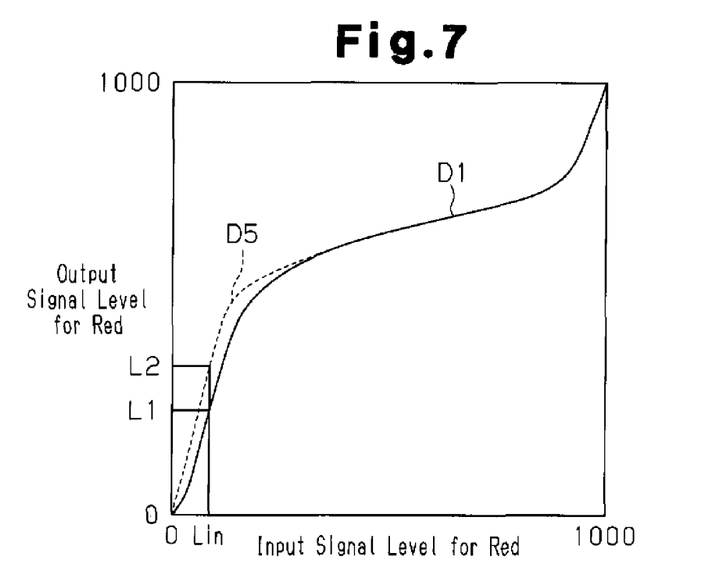
FIG. 7 is a chart showing the gamma correction data for a red image signal.
Figure 8:
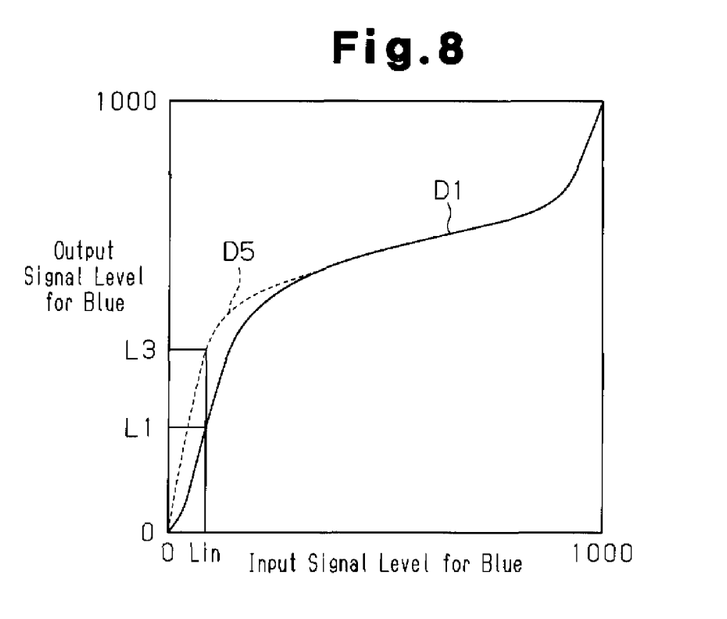
FIG. 8 is a chart showing the gamma correction data for a blue image signal.

An example of the digital gamma correction datum D is shown in FIGS. 6 to 8.

Digital gamma correction data D1 and D5 of FIGS. 6 to 8 is used to reduce the chromaticity difference between LCD projectors by bringing the chromaticity characteristics of the dextrorotatory projector closer to the chromaticity characteristics of the levorotatory projector (refer to the arrows in FIGS. 3 to 5). The solid lines of FIGS. 6 to 8 show the digital gamma correction datum D1 for the levorotatory projector. The broken lines of FIGS. 6 to 8 show the digital gamma correction datum D5 for the dextrorotatory projector. In FIGS. 6 to 8, the horizontal axis represents the level of the image signal input to the digital gamma correction circuit 3, and the vertical axis represents the output level of the image signal output from the gamma correction circuit 3 after performing the gamma correction process on the input level of the image signal. With regard to the input signal level that is input to the digital gamma correction circuit 3, in FIGS. 6 to 8, the maximum value of the input signal level corresponding to the highest luminance is represented by 1000, and the minimum value of the input signal level corresponding to the lowest luminance is represented by 0.

The digital gamma correction circuit 3 of a levorotatory projector performs the gamma correction on the received image signal G using the digital gamma correction datum D1, which is shown by the solid line of FIG. 6. The gamma corrected image signal G output from the digital gamma correction circuit 3 has a level of L1 when the image signal G has a level of Lin. The gamma correction of the image signal G for a dextrorotatory projector uses the digital gamma correction datum D5 (FIG. 6), which is similar to the digital gamma correction datum D1. Therefore, when the digital gamma correction circuit 3 of the dextrorotatory projector receives the image signal G having a level of Lin, the gamma corrected image signal G output from the digital gamma correction circuit 3 has a level of L1 in the same manner as the levorotatory projector.

In a levorotatory projector, the digital gamma correction circuit 3 performs the gamma correction on the received image signal R using the same datum (FIG. 7) same as the digital gamma correction datum D1 described above. Thus, the gamma corrected image signal R output from the digital gamma correction circuit 3 of the levorotatory projector has a level L1.

In a dextrorotatory projector, the digital gamma correction datum D5 (FIG. 7) differs from the digital gamma correction datum D1 used in the gamma correction of the image signal R. Therefore, when the digital gamma correction circuit 3 of the dextrorotatory projector receives the image signal R having a Lin level, the gamma corrected image signal R output from the digital gamma correction circuit 3 has a level of L2, which is higher than L1.

In the same manner, the digital gamma correction circuit 3 of the levorotatory projector performs the gamma correction on the image signal B having the Lin level using the same datum (FIG. 8) as the digital gamma correction datum D1 described above. The level of the image signal B output from the digital gamma correction circuit 3 becomes L1. The digital gamma correction datum D5 (FIG. 8) differs from the digital gamma correction datum D1 used in the gamma correction of the image signal B of the dextrorotatory projector. Therefore, when the image signal B having the Lin level is input to the digital gamma correction circuit 3 of the dextrorotatory projector, the image signal B output from the digital gamma correction circuit 3 has a level of L3, which is higher than L1, as shown in FIG. 7. The L3 level is higher than the L2 level.

In this manner, when the image signals R and B input to the digital gamma correction circuit 3 of the dextrorotatory projector has a low level, the digital gamma correction circuit 3 performs the gamma correction process to increase the level. This improves the coloring of red and blue, increases the sum of the red chromaticity and blue chromaticity, and relatively decreases the green chromaticity. Consequently, the green chromaticity of the dextrorotatory projector decreases and approaches the green chromaticity characteristics of the levorotatory projector as shown by the arrows in FIG. 4. An assumption will now be discussed for a state in which the sum of the red chromaticity and the blue chromaticity is 0.7 before gamma correction is performed with the digital gamma correction datum D5, and the sum is 0.8 after gamma correction is performed with the digital gamma correction datum D5. The sum of the chromaticity of each color is 1. Accordingly, if gamma correction is performed with the digital gamma correction datum D5, the green chromaticity is 0.3 before gamma correction is performed and decreases to 0.2 after gamma correction is performed. As for the image signal B input to the digital gamma correction circuit 3 of the dextrorotatory projector, gamma correction process is performed to increase the level of the image signal B when it is low to a level that is higher than the gamma correction processed image signal R. This further enhances the coloring of blue compared to the coloring of red, increases the blue chromaticity, and slightly decreases the red chromaticity relatively. Therefore, the red chromaticity characteristic of the dextrorotatory projector approaches the red chromaticity characteristics of the levorotatory projector as shown by the arrows in FIG. 3. Since the coloring of blue is most enhanced, the blue chromaticity characteristic of the dextrorotatory projector approaches the blue chromaticity characteristics of the levorotatory projector as shown by the arrows in FIG. 5. Accordingly, in the black side gradient in which the luminance is low, the chromaticity characteristics of the dextrorotatory projector are brought closer to the chromaticity characteristics of the levorotatory projector. This reduces the differences in chromaticity characteristics between the dextrorotatory projector and the levorotatory projector.

Figure 9:
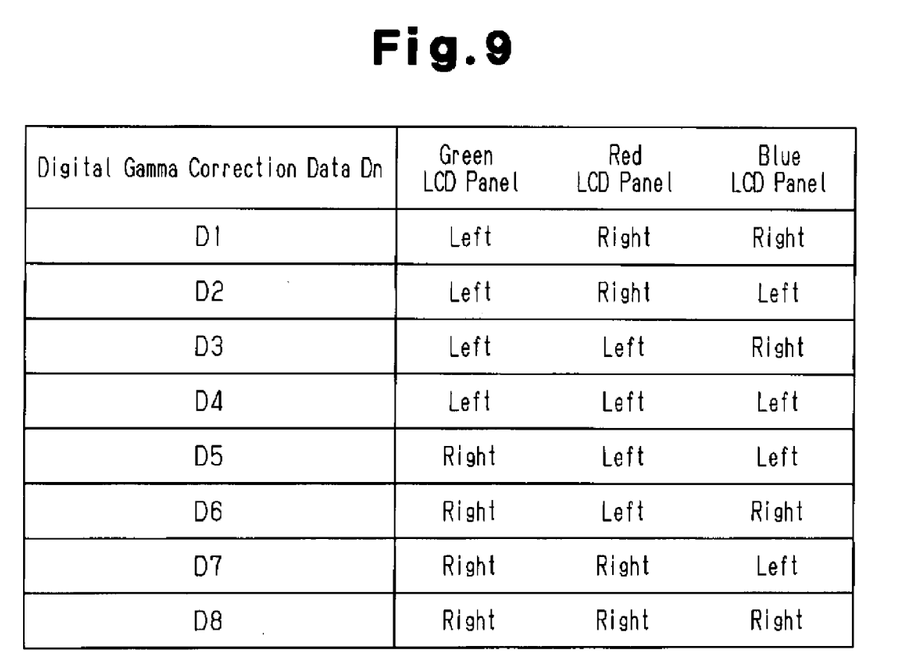
FIG. 9 is a table showing the gamma correction data stored in a storage device of the first embodiment.

As described above, the digital gamma correction data Dn differs depending on the combination of the levorotatory panel and the dextrorotatory panel. As shown in FIG. 9, eight types of digital gamma correction data D1 to D8 corresponding to all the combinations of the chiral directions of the LCD panels 7 to 9 are prepared in advance and stored in the ROM 13 or the RAM 14. In FIG. 9, "left" represents a levorotatory panel and "right" represents a dextrorotatory panel. The gamma correction process is performed using the optimum digital gamma correction datum Ddef, that is, the initialized digital gamma correction datum until any one of the LCD panels 7 to 9 is replaced.

The digital gamma correction circuit 3 provides the gamma correction processed image signals R, G, and B to the LCD drivers 4 to 6. The LCD drivers 4 to 6 respectively drive the LCD panels 7 to 9 based on the image signals R, G, and B. Specifically, the LCD driver 4 performs AC inversion on the gamma corrected image signal R at a predetermined timing in accordance with a clock signal CLK provided by the timing controller 10. Then, the LCD driver 4 provides the AC inverted image signal R to the red LCD panel 7 to drive the red LCD panel 7. The LCD driver 5 performs AC inversion on the gamma corrected image signal G at a predetermined timing in accordance with the clock signal CLK. Then, the LCD driver 5 provides the AC inverted image signal G to the red LCD panel 8 to drive the green LCD panel 8. The LCD driver 6 performs AC inversion on the gamma corrected image signal B at a predetermined timing in accordance with the clock signal CLK. Then, the LCD driver 6 provides the AC inverted image signal B to the blue LCD panel 9 to drive the blue LCD panel 9.

The LCD drivers 4 to 6 may include a phase expansion circuit (not shown). In this case, the image signals R, G, and B are simultaneously provided to the plurality of display segments of the LCD panels 7 to 9.

The timing controller 10 provides the LCD panels 7 to 9 with a timing pulse TP for driving the LCD panels 7 to 9 based on the horizontal synchronous signal Hsync and the vertical synchronous signal Vsync of the image signals R, G, and B (i.e., timing pulse for controlling horizontal and vertical write transfer in the LCD panels 7 to 9).

In each LCD panel 7 to 9, the write transfer in the horizontal direction and the vertical direction is controlled based on the timing pulse TP provided from the timing controller 10. Simultaneously, the corresponding AC inverted image signals R, C, and B are written to predetermined pixels. An image is formed on each LCD panel 7 to 9 in this manner.

Light from a light source (not shown) is transmitted through the image formed on each LCD panel 7 to 9 to generate red (R) image light, green (G) image light, and blue (B) image light. The generated image lights are combined into a color image light by a dichroic prism (not shown). A projection lens (not shown) enlarges and projects the color image light on a projector screen.

Replacement of the LCD panels 7 to 9 will now be discussed with reference to the flowchart of FIG. 10.

One or more of the LCD panels 7 to 9 may be replaced during maintenance of the LCD projector 1. As described above, the optimum digital gamma correction datum Pdef is set for the LCD projector 1 when manufacturing the LCD projector 1. Therefore, in step S5, before replacing the LCD panels 7 to 9, the digital gamma correction circuit 3 uses the optimum digital gamma correction datum Ddef to perform the gamma correction process.

Then, the one or more of the LCD panels 7 to 9 from which the desired image quality can no longer be obtained is replaced (step S6). In step S7, after the replacement, the digital gamma correction datum suitable for the combination of the LCD panels 7 to 9 is set (or validated).

Figure 11:
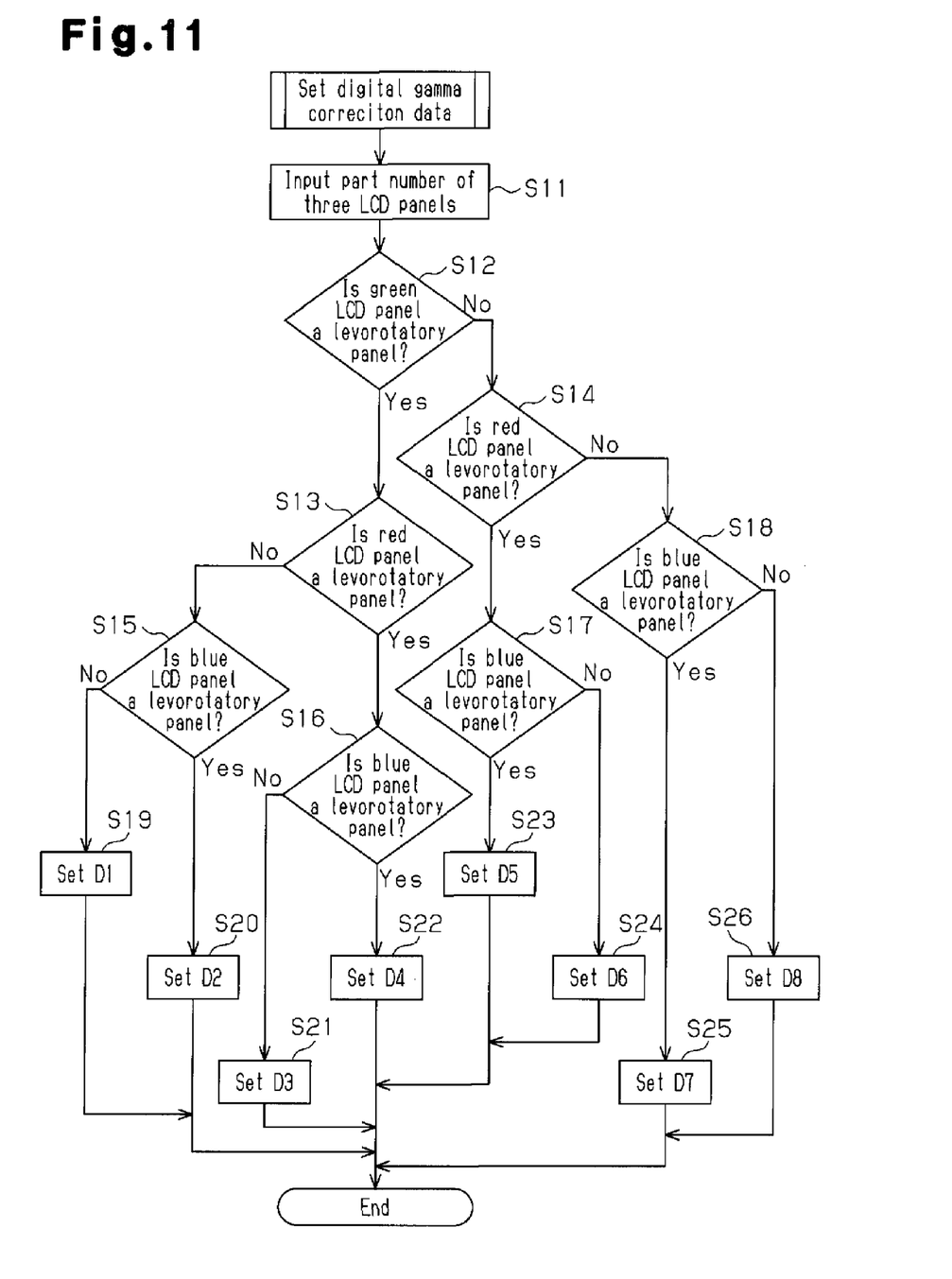
FIG. 11 is a flowchart showing the procedures for setting the gamma correction data in the first embodiment.

FIG. 11 shows step S7 in detail.

In step S11 of FIG. 11, the maintenance personnel uses the remote controller 16 to inputs the part numbers of the LCD panels 7 to 9 that have been replaced and installed in the LCD projector 1. The remote controller 16 transmits the part numbers to the remote controller signal receiver 15. The part number (i.e., manufacturer's serial number) of an LCD panel includes information on the chiral direction of the LCD panel. The remote controller signal receiver 15 acquires the chirality data on the chiral direction of the LCD panel 7 to 9 after replacement from the received part number and provides the chirality data to the CPU 12.

The CPU 12 may acquire the chirality data on the chiral direction of the LCD panel through means other than the remote controller signal receiver 15. For example, if the LCD projector 1 includes an input unit such as an input operation button, the maintenance personnel may operate the input unit to input chirality data on the chiral direction of the LCD panel that have been replaced to the LCD projector 1.

In step S12, the CPU 12 determines whether the green LCD panel 8 is a levorotary panel based on the data received from the remote controller signal receiver 15. If the determination is YES in step S12, the CPU 12 then determines whether the red LCD panel 7 is a levorotary panel (step S13). If the determination is NO in step S12, the CPU 12 then determines whether the red LCD panel 7 is a levorotary panel (step S14). If the determination is YES in step S13, the CPU 12 then determines whether the blue LCD panel 9 is a levorotary panel (step S15). If the determination is YES in step S14, the CPU 12 then determines whether the blue LCD panel 9 is a levorotary panel (step S17). If the determination is NO in step S14, the CPU 12 determines whether the blue LCD panel 9 is a levorotary panel (step S18). In this manner, the CPU 12 determines the combination of the levorotary panel and the dextrorotary panel for the LCD panels 7 to 9 that have been replaced based on the received chirality data.

The CPU 12 then selects the gamma correction datum corresponding to the combination of the LCD panels 7 to 9 that have been replaced from the stored digital gamma correction data Dn and sets the selected gamma correction datum as the updated digital gamma correction datum. In the subsequent gamma correction, the updated digital gamma correction datum is used in place of the digital gamma correction datum Ddef.

Specifically, if the determination is NO in step S15, the blue LCD panel 9 is a dextrorotary panel, the green LCD panel 8 is a levorotatory panel, and the red LCD panel 7 is a dextrorotary panel in the LCD projector 1. In this case, the CPU 12 sets the digital gamma correction datum D1 as the updated digital gamma correction datum (step S19). In the subsequent gamma correction, the digital gamma correction circuit 3 uses the updated digital gamma correction datum D2 in place of the digital gamma correction datum Ddef.

Similarly, if the determination is YES in step S15, the CPU 12 sets the digital gamma correction datum D2 (step S20). If the determination is NO in step S16, the CPU 12 sets the digital gamma correction datum P3 (step S21). If the determination is YES in step S16, the CPU 12 sets the digital gamma correction datum D4 (step S22). If the determination is YES in step S17, the CPU 12 sets the digital gamma correction datum D5 (step S23). If the determination is NO in step S17, the CPU 12 sets the digital gamma correction datum D6 (step S24). If the determination is YES in step S18, the CPU 12 sets the digital gamma correction datum D7 (step S25). If the determination is NO in step S18, the CPU 12 sets the digital gamma correction datum DP (step S26).

The CPU 12 sets the digital gamma correction data D1 to D8 by rewriting the program stored in the ROM 13 or writing the updated digital gamma correction datum (one of Dn) over the optimum digital gamma correction datum Ddef used before panel replacement.

As described above, the CPU 12 sets the digital gamma correction datum corresponding to the new combination of the chiral directions of the LCD panels 7 to 9 incorporated in the LCD projector 1 as the updated gamma correction datum based on the chirality data on the chiral direction of the LCD panels 7 to 9 acquired by the remote controller signal receiver 15.

Figure 10:
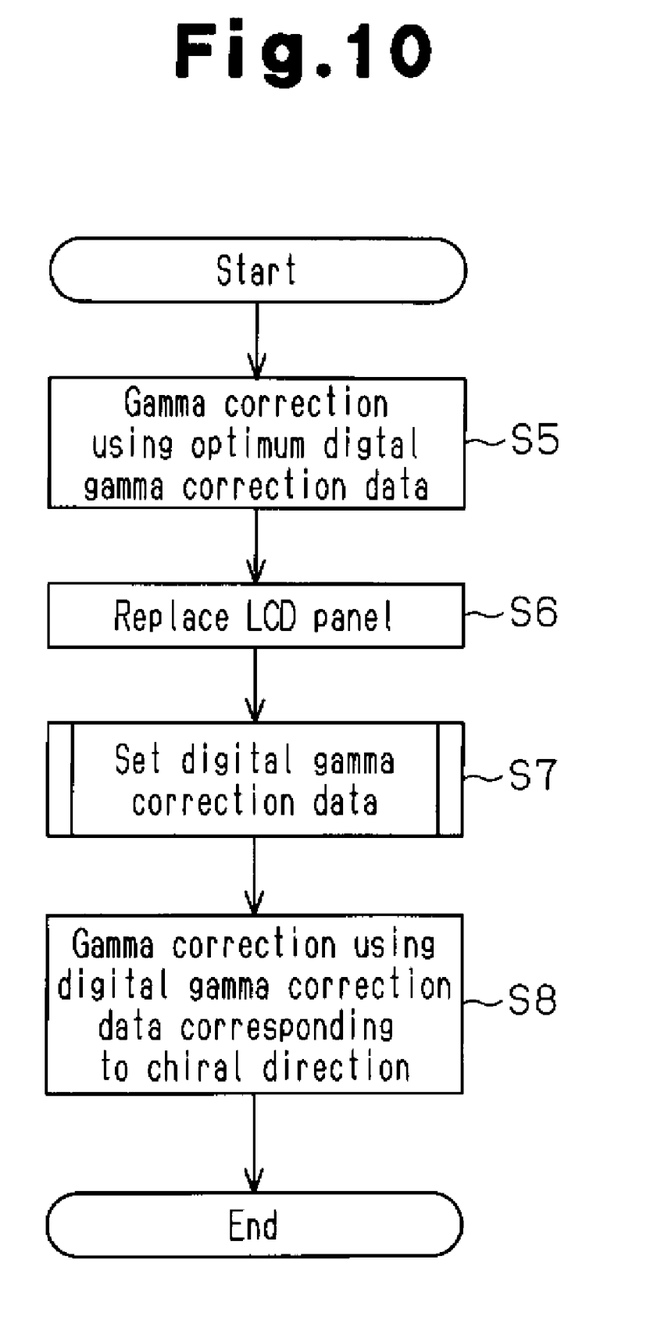
FIG. 10 is a flowchart showing the operation of the LCD projector before and after replacement of a LCD panel.

Therefore, after setting the digital gamma correction datum, the digital gamma correction circuit 3 of the LCD projector 1 performs the gamma correction process using the updated digital gamma correction datum (one of Dn) (step S8 of FIG. 10). In other words, the digital gamma correction circuit 3 performs the digital gamma correction process on the image signals R, G, and B based on the single updated digital gamma correction datum selected from the stored digital gamma correction data Dn (i.e., digital gamma correction data D1 to D8) stored in advance in the ROM 13 or the RAM 14. Accordingly, the change in the chromaticity characteristics of the LCD projector 1 caused by the difference in the combination of the chiral directions of the LCD panels prior to and subsequent to replacement of the LCD panels 7 to 9 is suppressed by the gamma correction using the appropriately updated digital gamma correction datum.

The first embodiment has the advantages described below.

(1) In the gamma correction device of the first embodiment, the ROM 13 or the RAM 14 stores in advance the digital gamma correction data Dn corresponding to the combination of the chiral directions of the LCD panels 7 to 9. The remote controller signal receiver 15 acquires the chirality data on the chiral direction of the LCD panels 7 to 9. The CPU 12 sets the digital gamma correction datum corresponding to the combination of the chiral directions of the LCD panels 7 to 9 from the plurality of digital gamma correction data Dn based on the chirality data on acquired by the remote controller signal receiver 15. The digital gamma correction circuit 3 performs the gamma correction on the image signals R, G, and B using the digital gamma correction datum set by the CPU 12. Therefore, differences in the chromaticity characteristics of the LCD projector 1 caused by the combination of the chiral directions of the LCD panels 7 to 9 is effectively reduced. Furthermore, the gamma correction datum is easily set without using a measurement instrument such as illumination sensor.

(2) The gamma correction method of the first embodiment includes the step of storing in advance the digital gamma correction data Pn corresponding to the combination of the chiral directions of the plurality of LCD panels in the storage device (step S4). The method also includes the step S11 of acquiring the chirality data on the chiral direction of the LCD panels 7 to 9 incorporated in the LCD projector 1, the steps S19 to S26 of setting the digital gamma correction datum in correspondence to the new combination of the chiral directions of the LCD panels 7 to 9 in the LCD projector 1 as the updated gamma correction datum based on the acquired chirality data, and the step S8 of performing the gamma correction process on the image signals R, G, and B provided to the LCD panels 7 to 9 using the updated digital gamma correction datum. Therefore, differences in the chromaticity characteristics of the LCD projector 1 caused by the combination of the chiral directions of the LCD panels 7 to 9 is effectively reduced. Furthermore, the gamma correction datum is easily set without using a measurement instrument such as illumination sensor. Moreover, it is possible to perform on-site, optimum gamma correction easily when one or more LCD panels in an LCD projector is on-site replaced.

Figure 12:
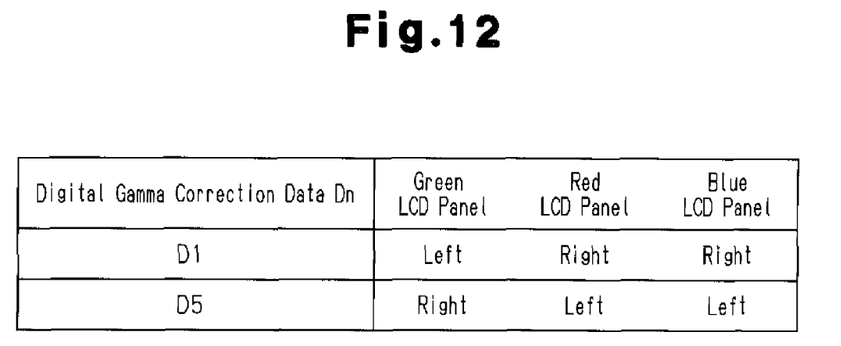
FIG. 12 is a table showing gamma correction data corresponding to the combination of chiral directions of the LCD panels according to a second embodiment of the present invention.
Figure 13:
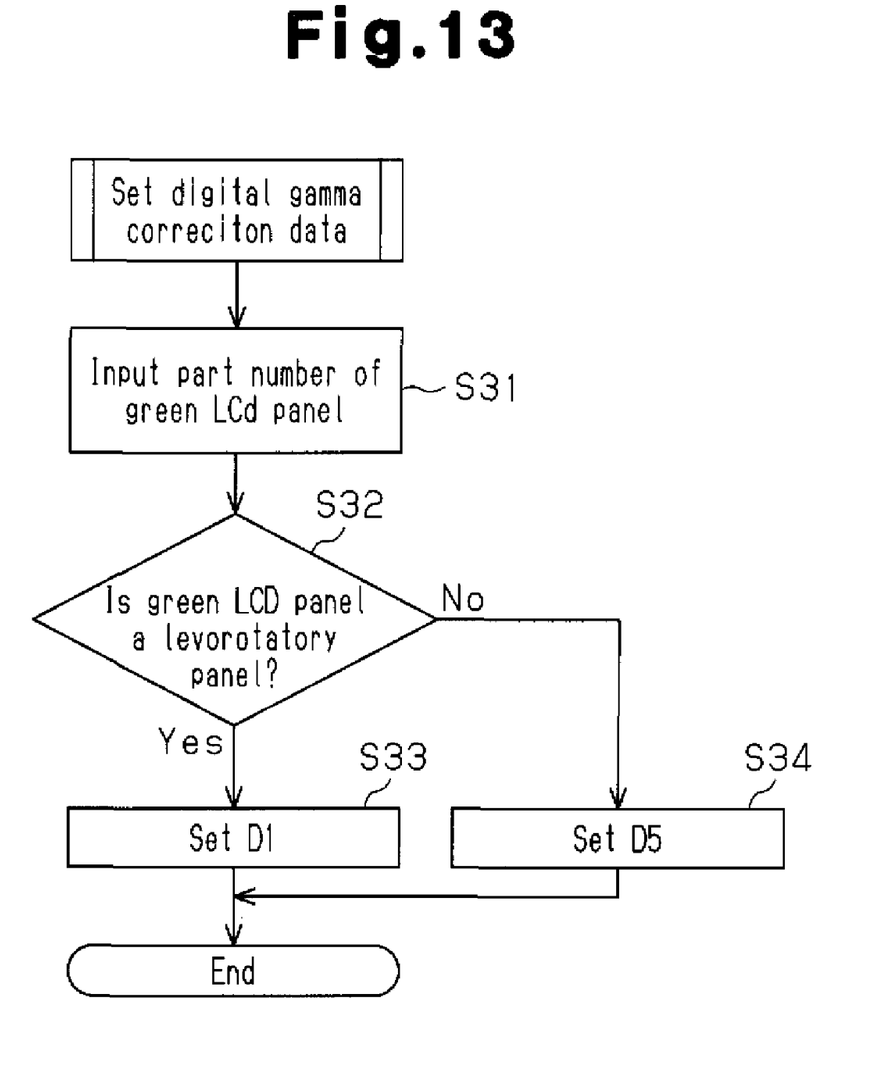
FIG. 13 is a flowchart showing the procedures for setting the gamma correction data in the second embodiment.

A second embodiment of the present invention will now be described with reference to FIGS. 12 and 13. FIG. 12 shows the digital gamma correction data Dn stored in a storage device. FIG. 13 is a flowchart showing the procedures for setting the digital gamma correction data in the second embodiment. The gamma correction device of the second embodiment is incorporated in the liquid crystal display device. The liquid crystal display device is an LCD projector incorporating three LCD panels. To avoid redundancy, like or same reference numerals are given to those components that are the same as the corresponding components of the first embodiment. Such components will not be described.

The LCD projector 1 of the second embodiment has the structure shown in FIG. 1 and is similar to the first embodiment. The LCD panels 7 to 9 are arranged near the dichroic prism (not shown). The dichroic prism and the LCD panels 7 to 9 form an integrated optical block. Therefore, when replacing one of the LCD panels 7 to 9, the optical block must be replaced since the replacement of only one LCD panel is not possible. In the second embodiment, the chiral direction of the green LCD panel 8 differs from the chiral directions of the red LCD panel 7 and the blue LCD panel 9.

The digital gamma correction datum (digital gamma correction datum Ddef and digital gamma correction data Dn) of the second embodiment is stored in the ROM 13 or the RAM 14 in advance through the same procedures (FIG. 2) as the first embodiment. The digital gamma correction data Dn of the second embodiment include the two types of digital gamma correction datum D1 and D5 that correspond to the combination of the LCD panels 7 to 9, as shown in FIG. 12. In FIG. 12, "left" refers to the levorotary panel and "right" refers to the dextrorotatory panel.

In the second embodiment, after the optical block is replaced in step S6 of FIG. 10, the setting of the digital gamma correction datum shown in FIG. 13 is performed instead of the flowchart of FIG. 11.

In step S31 of FIG. 13, the maintenance personnel inputs the part number of the green LCD panel 8 in the optical block to the remote controller signal receiver 15 into the remote controller 16 after replacing the optical block. The part number of the green LCD panel 8 includes chirality data on the chiral direction of the green LCD panel 8. Thus, in step S31, the remote controller signal receiver 15 acquires the chirality data on the chiral direction of the green LCD panel 8 that has been newly installed in the LCD projector 1.

In step S32, the CPU 12 determines whether the green LCD panel 8 is a levorotary panel based on the data received from the remote controller signal receiver 15. If the determination is YES in step S32, the red LCD panel 7 and the blue LCD panel 9 are automatically determined as being dextrorotary panels. Thus, the LCD projector 1 is a levorotatory projector, which is described in the first embodiment. In this case, the CPU 12 sets the digital gamma correction datum D1 (step S33). On the other hand, if the determination is NO in step S32, the red LCD panel 7 and the blue LCD panel 9 are automatically determined as being a levorotary panel. Thus, the LCD projector 1 is a dextrorotatory projector, which is described in the first embodiment. In this case, the CPU 12 sets the digital gamma correction datum D5 (step S34).

As described above, the CPU 12 sets the digital gamma correction datum in correspondence with the combination of the chiral directions of the LCD panels 7 to 9 based on the chirality data on the chiral direction of the green LCD panel 8 acquired by the remote controller signal receiver 15.

After setting the digital gamma correction datum, the digital gamma correction circuit 3 of the LCD projector 1 performs the gamma correction process using the digital gamma correction datum that has been updated in correspondence to the combination of the chiral directions in step S8 of FIG. 10. In other words, the digital gamma correction circuit 3 performs the gamma correction process on the image signals R, G, and B based on the digital gamma correction datum (D1 or D5) updated in correspondence to the combination of the chiral directions of the LCD panels 7 to 9 in the LCD projector 1. Accordingly, the change in the chromaticity characteristics of the LCD projector 1 caused by the difference in the combination of the chiral directions of the LCD panels prior to and subsequent to replacement of the LCD panels 7 to 9 is suppressed by the gamma correction using the appropriately updated digital gamma correction datum.

The second embodiment has the advantages described below in addition to the advantages (1) and (2) of the first embodiment.

(3) In the second embodiment, the remote controller signal receiver 15 acquires the chirality data on the chiral direction of the green LCD panel 8 of the LCD panels 7 to 9 in the LCD projector 1 but does not acquire the chirality data on the chiral directions of the remaining LCD panels 7 and 9. The CPU 12 recognizes the combination of the chiral directions of the LCD panels 7 to 9 in the LCD projector 1 based on the chirality data on the chiral direction of the green LCD panel 8 acquired by the remote controller signal receiver 15 and sets the digital gamma correction datum from the stored digital gamma correction data Dn stored in advance in the ROM 13 or RAM 14 in accordance with the recognized combination. In this manner, the chirality data on the chiral direction of the red LCD panel 7 and the blue LCD panel 9 do not need to be input, and the digital gamma correction datum is easily set.

(4) In the digital gamma correction method of the second embodiment, the chirality data on the chiral direction of the green LCD panel B of the LCD panels 7 to 9 in the LCD projector 1 are acquired in step S31. In step S33 and step S34, the updated digital gamma correction datum is set in a manner adapted to the combination of the LCD panels 7 to 9 that have been newly installed in the LCD projector 1 based on the acquired chirality data on the chiral direction of the green LCD panel 8. Thus, the chirality data on the chiral direction of the red LCD panel 7 and the blue LCD panel 9 do not need to be input, and the digital gamma correction datum is easily set.

It should be apparent to those skilled in the art that the present invention may be embodied in many other specific forms without departing from the spirit or scope of the invention. Particularly, it should be understood that the present invention may be embodied in the following forms.

In each of the above embodiments, the digital gamma correction circuit 3 performs the gamma correction process on the digital image signals R, G, and B. However, the gamma correction may be performed on analog image signals R, G, and B. In other words, an analog gamma correction circuit may used to perform gamma correction on analog image signals R, G, and B provided to the LCD panels as long as the gamma correction reduces differences in the chromaticity characteristics.

In each of the above embodiments, the gamma correction device 17 acquires chirality data on the chiral direction of the LCD panels 7 to 9 by from the part numbers of the LCD panels 7 to 9 input to the remote controller signal receiver 15. However, the chirality data on the chiral direction of the LCD panel may be acquired through methods other than inputting the part number.

The gamma correction device 17 of each embodiment is incorporated in the LCD projector 1. However, the gamma correction device may be arranged outside the LCD projector as long as the gamma correction device and the LCD projector are connected so that the gamma correction process can be performed on the image signals R, G, and B provided to the LCD panels 7 to 9.

In the second embodiment, the digital gamma correction datum corresponding to the chiral direction of each of the three LCD panels 7 to 9 is set based on the chirality data on the chiral direction of the green LCD panel 8 but does not need to be based on the chirality data on the chiral direction of the green LCD panel 8. In other words, the digital gamma correction datum corresponding to the chiral direction of each of the three LCD panels 7 to 9 just needs to be set based on the chirality data on the chiral direction of a single LCD panel.

The present examples and embodiments are to be considered as illustrative and not restrictive, and the invention is not to be limited to the details given herein, but may be modified within the scope and equivalence of the appended claims.

What is claimed is:

1. A gamma correction device for a liquid crystal display device, comprising:
   a storage device which stores gamma correction data corresponding to chiral directions of liquid crystal display panels;
   a chiral direction data acquisition circuit which acquires chirality data on a chiral direction of a liquid crystal display panel arranged in the liquid crystal display device;
   a control circuit, connected to the chiral direction data acquisition circuit, which sets a gamma correction datum adapted to the chiral direction of the liquid crystal display panel arranged in the liquid crystal display device selectively from the stored gamma correction data based on the acquired chirality data; and
   a gamma correction circuit which performs a gamma correction process on image signals provided to the liquid crystal display panel using the set gamma correction datum.

2. The device according to claim 1, wherein:
   the liquid crystal display device includes three liquid crystal display panels;
   the storage device previously stores alternative gamma correction data corresponding to possible combinations of the chiral directions of the three liquid crystal display panels;
   the chiral direction data acquisition circuit acquires chirality data on the chiral direction of one of the three liquid crystal display panels; and
   the control circuit sets a gamma correction datum adapted to a combination of the chiral directions of the three liquid crystal display panels selectively from the stored gamma correction data based on the acquired chirality data on the chiral direction of said one of three liquid crystal display panels received from the chiral direction data acquisition circuit.

3. The device according to claim 1, wherein:
the liquid crystal display device includes a plurality of liquid crystal display panels;
the storage device previously stores alternative gamma correction data corresponding to possible combinations of the chiral directions of the plurality of liquid crystal display panels;
the chiral direction data acquisition circuit acquires chirality data on the chiral directions of the plurality of liquid crystal display panels arranged in the liquid crystal display device; and
the control circuit sets a gamma correction datum adapted to the combination of the chiral directions of the plurality of liquid crystal display panels arranged in the liquid crystal display device selectively from the stored gamma correction data based on the acquired chirality data on the chiral directions of the liquid crystal display panels.

4. The device according to claim 3, wherein the chiral direction data acquisition circuit wirelessly receives a part number of one of the plurality of liquid crystal display panels and acquires chirality data on the chiral direction of said one of the plurality of liquid crystal display panels based on the wirelessly received part number.

5. A gamma correction method for a liquid crystal display device, the method comprising:
storing gamma correction data corresponding to chiral directions of liquid crystal display panels;
acquiring chirality data on a chiral direction of a liquid crystal display panel arranged in the liquid crystal display device;
setting a gamma correction datum adapted to the chiral direction of the liquid crystal display panel arranged in the liquid crystal display device selectively from the stored gamma correction data based on the acquired chirality data; and
performing a gamma correction process on image signals provided to the liquid crystal display panel using the set gamma correction datum.

6. The method according to claim 5, wherein:
the liquid crystal display device includes three liquid crystal display panels;
said storing includes previously storing alternative gamma correction data corresponding to possible combinations of the chiral directions of the three liquid crystal display panels;
said acquiring chirality data includes acquiring chirality data on the chiral direction of one of the three liquid crystal display panels; and
said setting a gamma correction datum includes setting a gamma correction datum adapted to a combination of the chiral directions of the three liquid crystal display panels selectively from the stored gamma correction data based on the acquired chirality data on the chiral direction of said one of three liquid crystal display panels.

7. The method according to claim 5, wherein:
the liquid crystal display device includes a plurality of liquid crystal display panels;
said storing includes previously stores alternative gamma correction data corresponding to possible combinations of the chiral directions of the plurality of liquid crystal display panels;
said acquiring chirality data includes acquires chirality data on the chiral directions of the plurality of liquid crystal display panels arranged in the liquid crystal display device; and
said setting includes setting a gamma correction datum adapted to the combination of the chiral directions of the plurality of liquid crystal display panels selectively from the stored gamma correction data based on the acquired chirality data on the chiral directions of the liquid crystal display panels.

8. The method according to claim 7, wherein said acquiring chirality data includes wirelessly receiving a part number of one of the plurality of liquid crystal display panels and acquiring chirality data on the chiral direction of said one of the plurality of liquid crystal display panels based on the wirelessly received part number.

* * * * *